(12) United States Patent
Levine

(10) Patent No.: US 7,901,752 B2
(45) Date of Patent: Mar. 8, 2011

(54) ADVANCED BATTERY PASTER BELT

(75) Inventor: Mark J. Levine, Hendersonville, TN (US)

(73) Assignee: Albany International Corp., Albany, NY (US)

( * ) Notice: Subject to any disclaimer, the term of this patent is extended or adjusted under 35 U.S.C. 154(b) by 1120 days.

(21) Appl. No.: 11/454,702

(22) Filed: Jun. 16, 2006

(65) Prior Publication Data

US 2008/0009212 A1    Jan. 10, 2008

(51) Int. Cl.
*B32B 5/26* (2006.01)

(52) U.S. Cl. ........ 428/36.2; 442/241; 442/247; 442/268; 442/270; 442/271; 28/117

(58) Field of Classification Search ................. 442/271, 442/241, 247, 268, 270; 428/36.2; 28/117
See application file for complete search history.

(56) References Cited

U.S. PATENT DOCUMENTS

| | | | |
|---|---|---|---|
| 3,904,040 | A | 9/1975 | Gilbert |
| 4,050,482 | A | 9/1977 | Ching et al. |
| 4,425,392 | A | 1/1984 | Oikawa et al. |
| 4,427,734 | A | 1/1984 | Johnson |
| 4,482,601 | A | 11/1984 | Hartigan, Jr. |
| 4,604,310 | A | 8/1986 | Bertotto |
| 4,932,443 | A | 6/1990 | Karolek et al. |
| 5,276,960 | A | 1/1994 | Wheadon et al. |
| 5,533,941 | A | 7/1996 | Heim |
| 5,840,635 | A | 11/1998 | Bertotto |
| 6,352,772 | B1 | 3/2002 | Keller |
| 6,425,985 | B1 | 7/2002 | Hagfors et al. |
| 6,479,414 | B1 | 11/2002 | Hauer |
| 6,766,817 | B2 | 7/2004 | da Silva |
| 6,875,314 | B2 | 4/2005 | Korfer et al. |
| 6,918,404 | B2 | 7/2005 | Dias da Silva |
| 7,066,586 | B2 | 6/2006 | da Silva |

FOREIGN PATENT DOCUMENTS

EP          0 836 930 A    4/1998

*Primary Examiner* — Elizabeth M Cole

(74) *Attorney, Agent, or Firm* — Frommer Lawrence & Haug LLP; Ronald R. Santucci; Vivek Shankam

(57) ABSTRACT

A belt designed for lead acid battery plate pasting that is rendered dimensionally stable and incompressible and is also rendered hydrophobic to allow water handling without absorption and subsequent contamination of lead oxide into the structure.

24 Claims, 2 Drawing Sheets

ADVANCED BATTERY PASTER BELT

BACKGROUND OF THE INVENTION

1. Field of the Invention

The invention relates to an industrial belt and more particularly relates to a paster belt that carries battery paste for use in the manufacture of lead-acid batteries and the method of its fabrication.

2. Description of the Prior Art

The present invention relates to an industrial belt, particularly a battery paster belt that is used in the manufacture of lead acid batteries. The conventional lead-acid batteries consist of several positive and negative plates separated by porous separators. The plates are produced by pasting a lead oxide material over a lead wire grid. After the positive and negative plates are pasted, they are cured, with each of the plates having a lug disposed on the top portion of the plate. Prior to these plates being placed in the battery container, a separator is placed between each plate and the negative and positive plate lugs are joined by two separate plate straps, one for the positive plate lugs and one for the negative plate lugs. Once placed into the container the intercell connections are made and the battery container and cover are sealed together. The battery is electrochemically formed by welding the positive and negative posts in the cover, and adding the acid.

There are many known processes for making lead-acid batteries. In brief, the process involves feeding a ribbon of lead into an inline expander to produce a continuous bilateral length of grid making stock. The stock has a central unexpanded strip and two unexpanded strips at the lateral edges. Between the central unexpanded strip and each lateral edge, there is a network of grid wires formed by the expander. The grid-making stock enters a belt paster for filling the grid network with battery paste. The pasting machine sandwiches the grid making stock and paste between paper strips fed from paper rolls. Plate forming stock exits the paster and passes into an oven for drying. Following drying and cutting, the plate forming stock is ready for curing. After curing, a stacker accumulates the plates for subsequent processing into a lead-acid battery.

During this process, the battery plates are normally produced by passing cast grids through an orifice-type or belt-type paster. Plates may be "flush pasted" (i.e., the thickness of the paste layer is approximately equal to the thickness of the grid) or "overpasted" on one side (i.e., the paste layer is flush with one surface of the grid but extends beyond the surface of the grid on the opposite side). In either case, the surfaces of the paste on opposite sides of the plate are normally smooth and parallel.

State of the art paster belts include 6-8 ply integrally woven layer cotton belts which are glued/sewn to make endless felts such as that described in U.S. Pat. No. 4,604,310. There are several drawbacks to these type of belts. Such belts typically have poor dimensional stability, in which the belts can elongate when wet and can exceed the maximum machine take-up on the most common paster machines due to a creep greater than 1.5% within usually 24 hours after installation. Also, the seam construction in cotton belts typically involves manually gluing and sewing for the required strength during operation. This manual process results in seams with wide strength variability, and accordingly a poor belt product consistency. Seam failure is a significant problem for such belts in operation. Additionally, in the seam area, which is typically about 3 inches long in the machine direction ("MD"), there is an impermeable zone which creates one off-spec battery plate with each revolution.

The dimensional stability of the aforementioned belt is obtained by use of many wrapped layers of high modulus polyester (PET) multifilament yarns. However, these many layers of fine fabric are easily damaged during the subsequent needling operation to add one or more batt fiber layers, which results in a wide distribution of creep characteristics in operation from belt to belt. Also, in paster belts it is desired that it imparts a certain type of mark in pasted plates to improve the surface area which provides for more cold cranking amps in the final battery product. To impart this mark, the surface of the paster belt must have a durable textured surface which can provide a consistent mark throughout the usable life of the belt.

However, the belts currently used employ threads of cotton and/or synthetic spun fibers (polyester or polyamide) in a plied structure for both wicking and texture. These threads are easily deformed and flattened by the 0.68-2.068 Mpa pressure that is exerted onto the belt under the pasting hopper causing a great reduction in surface texture as a function of time. This reduction in texture not only causes reduced plate surface area, but also creates worn grooves in the belt surface at the width of the plates being produced. These grooves prevent the manufacturer from switching between plate widths without installing a new belt as the grooves will result in paste thickness beyond normal specification limits across the belt width.

Also, the typical use of hydrophilic cotton fibers at the surface, which absorb water into their structures, creates an issue with lead oxide adhesion and absorption. This results in belts which tend to harden over time, reducing their water handling capacity, and accordingly adversely affects the belt's pasting efficiency. Moreover, as the lead becomes deeply embedded in the cotton fiber structure, it is difficult or impossible to clean the belt, especially if it is not kept continuously wet.

The present invention is directed to a battery paster belt and a method for forming such a paster belt that overcomes the shortcomings of the prior art.

SUMMARY OF THE INVENTION

The present invention provides for a laminated endless belt for lead acid battery pasting machines. The base fabric is made of endless woven high modulus monofilaments of polyester (PET) or polyamide (PA). The second fabric ply consists of two to five layers of monofilament flat woven fabric each with a layer of polyester and/or polyamide batt fiber continuously needled thereon. The third ply consists of several layers of compressed nonwoven batt fibers. The top fabric ply is a single layer of monofilament endless woven fabric laminated to the upper surface through needling polyester and/or polyamide batt fiber.

It is a further object of the invention to provide a dimensionally stable paster belt with a very low MD creep tolerance. e.g. less than 1.5% of the total length.

It is a further object of the invention to provide a paster belt of very low compressibility through the thickness to allow for paste thickness adjustment within the hopper height adjustability range.

It is a further object of the invention to provide a paster belt that is hydrophobic and allows for water handling without absorption and subsequent contamination of lead oxide into the belt structure.

It is a further object of the invention to provide a paster belt that is durable and avoids wear grooves on the surface.

It is a further object of the invention to provide a marking/imparting texture into the pasted plate that will function over a higher pressure range e.g. up to 2.757 Mpa.

The present invention is method of forming a battery paster belt having for example four plies: a first ply of made endless fabric that can be woven, joined or seamed, a second ply of two to five layers of flat woven fabrics needled with batt fiber layers, a third ply of one or more layers of 100% batt fiber and a fourth ply of another endless woven fabric, preferably the entire structure is laminated by needling additional polyester or polyamide batt fiber to the outermost surface of the belt and needling through fiber to hold the structure together.

The present invention provides for a laminated endless belt for lead acid battery pasting machines. The base (machine side) fabric is made of endless woven high modulus monofilaments of PET or PA. The second fabric ply consists of two to five layers of monofilament flat woven fabric each with a layer of polyester and/or polyamide batt fiber continuously needled for lamination. The third ply consists of several layers of 100% nonwoven batt fibers compressed to develop a consolidated layer of approximately 400 to 1000 gsm after needling. The top fabric ply is a single layer of endless woven fabric which has yarns in either MD or cross-machine direction ("CD") of approximately 0.4-0.9 mm diameter monofilament laminated to the upper surface through needling of usually no more than 400 gsm polyester and/or polyamide batt fiber whose fibers are of preferably of 3-10 dtex.

This new invention is a belt with four distinct regions of functionality which address all of the current flaws with existing technology. The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated.

DETAILED DESCRIPTION OF THE PREFERRED EMBODIMENTS

Figure 1:
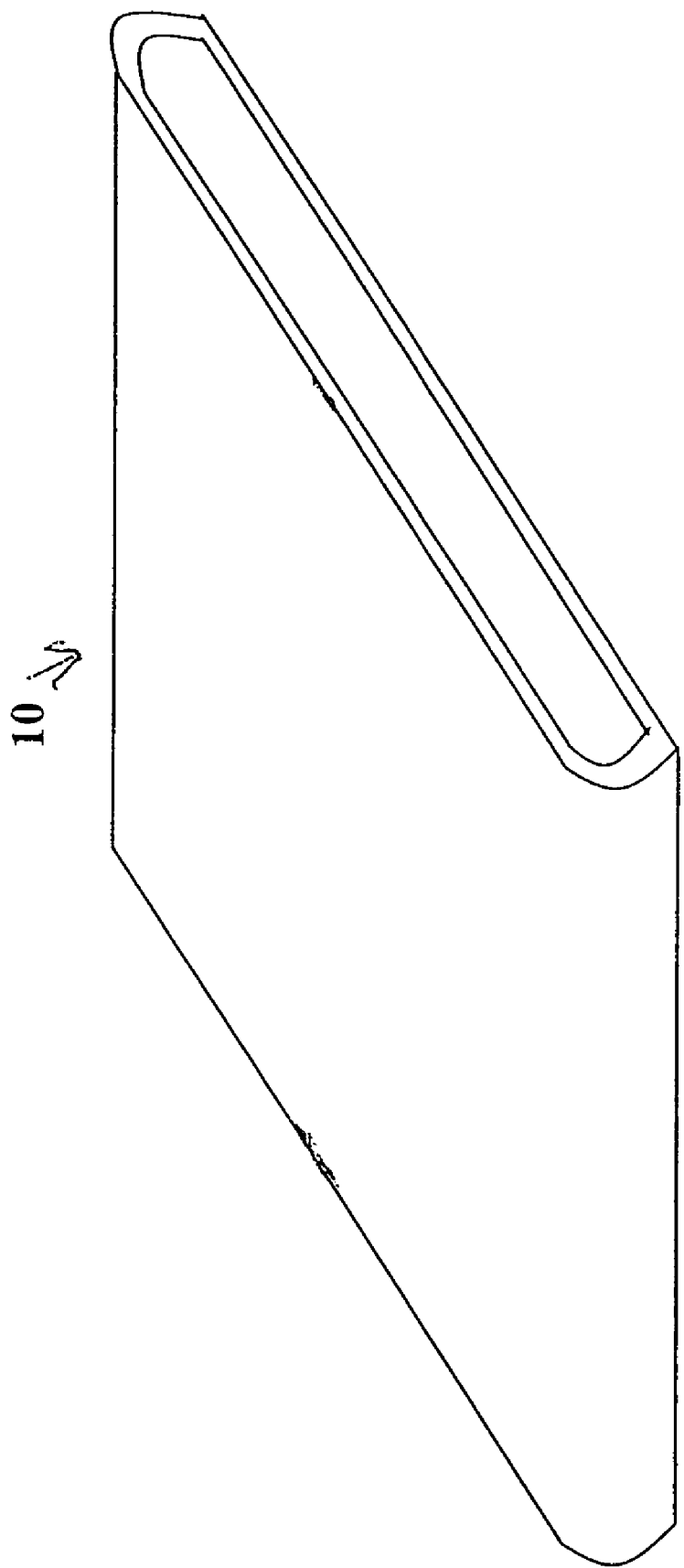
FIG. 1 is an endless battery paster belt.

The present invention provides for a battery paster belt 10. The belt 10 may be endless or made endless as shown in FIG. 1.

Figure 2:
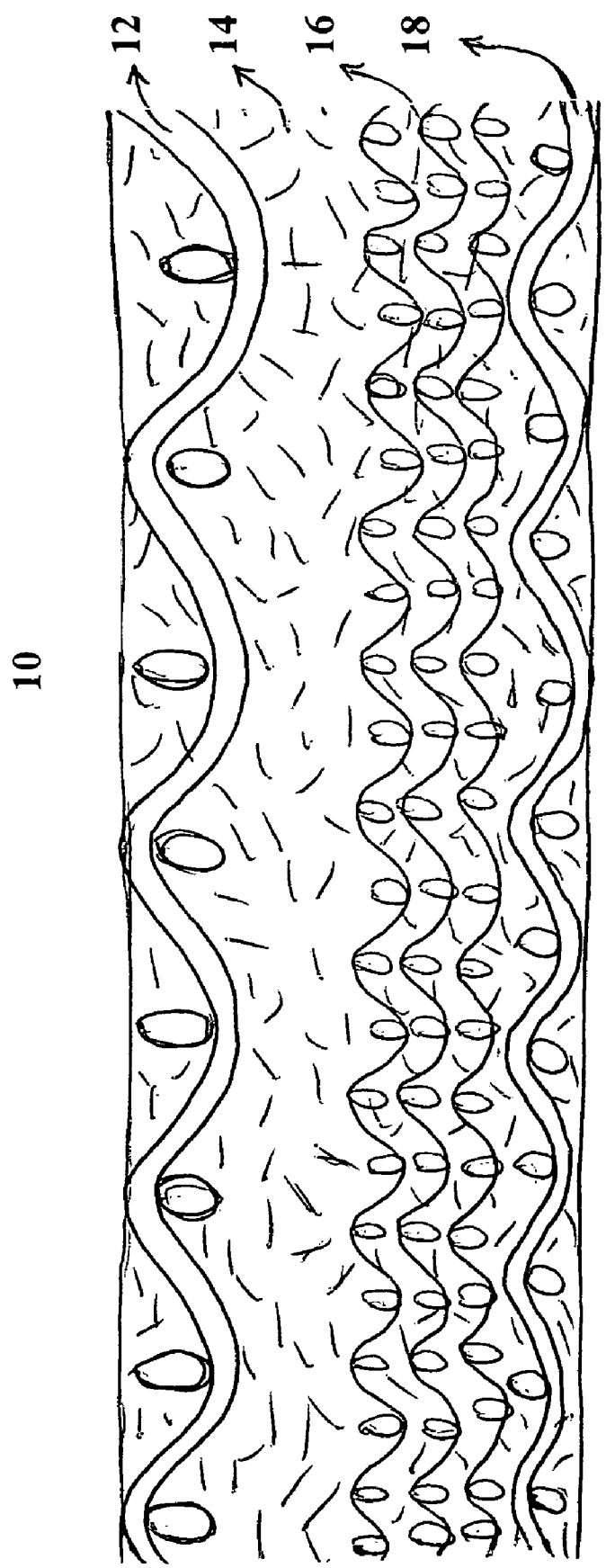
FIG. 2 is a cross-sectional view of the battery paster belt incorporating the teachings of the present invention.

FIG. 2 shows a cross-sectional view of the belt 10. In this regard, it comprises a first ply or base structure 12 that preferably is a full size MD and CD fabric and can be produced for example from approximately 0.20 mm-0.70 mm high modulus monofilaments made from either PET or PA. The first ply may be endless woven, joined or seamed with MD monofilaments preferably having a modulus greater than 70 gpd. This first ply is primarily responsible for initial fabric sizing uniformity and extremely low fabric creep in operation.

A second ply 14 which includes two to five layers of monofilament flat woven fabric, containing monofilaments of approximately 0.20-0.70 mm are wrapped around the high modulus monofilament first ply. Each wrap is performed in conjunction with a layer of preferably 3-10 dtex polyester and/or polyamide batt fiber wherein each wrapped layer is continuously needled for lamination. This is needled with a portion of the total batt component using conventional needling equipment. By portion, it is meant that an initial layer or layers of batt are applied to the base structure and additional layers are provided as the process progresses. This ply is largely responsible for the low compressibility of the final felt structure.

A third ply 16 is composed of 100% batt fiber. Successive layers of preferably 3-10 dtex polyester and/or polyamide batt fiber are wrapped around the endless structure to develop approximately 400-1000 gsm of a compressed nonwoven ply after needling. This ply is primarily responsible for water handling (absorption and desorption) while remaining easy to clean by use of synthetic fibers only.

A fourth ply 18 is composed of a monofilament endless woven top texture fabric. A single layer woven of approximately 0.40-0.90 mm monofilament endless woven fabric is laminated to the surface through needling of no more than 400 gsm of preferably 3-10 dtex polyester and/or polyamide batt fiber, the preferred end structure having the monofilament and batt fiber being monoplane at the surface as shown in FIG. 2. A single layer plain weave is preferred for the top layer in a 4-8 ends per cm square mesh, although other woven single layer or multiple layer or open meshes or nonwoven scrim; extruded mesh, embossed nonwoven or textured/porous film can also be envisioned. This ply is responsible for marking or imparting texture into the pasted plate surface while providing good water handling for lubrication in an easy to clean surface. The lubrication is a result of the entrapped moisture left in the void volume of the top monofilament fabric. The incompressible monofilament fabric prevents the surface from becoming too dry after the press roll. As compared to a cotton surface, which absorbs moisture in the fibers and remains wet at the surface, a surface with only synthetic batt fibers will essentially remain dry at the surface after the press roll. If the belt surface is too dry as it passes beneath the pasting hopper, the paste will not readily flow through and across the bottom side of the grid, resulting in under pasted or one sided grid. In effect, the monofilament void volume in the proposed structure is an alternative way to provide the required lubricating moisture that cotton fibers can naturally provide, but, synthetic fibers cannot. The use of monofilament in this ply at the surface also provides a high degree of structural durability to avoid the before mentioned wear grooves for an extended period of time.

Note that while the base structure and plies are referred to as being woven, alternative structures that may be suitable for the purpose are envisioned including nonwovens such as knitted, extruded mesh, spiral-link, MD and CD yarn arrays, and spiral wound strips of woven and nonwoven materials. These structures and plies may include yarns of monofilament, plied monofilament, multifilament or plied multifilament, and may be single-layered, multi-layered or laminated themselves. The yarns are typically extruded from any one of the synthetic polymeric resins, such as polyamide and polyester resins, used for this purpose by those of ordinary skill in the industrial fabric arts.

For example, a battery paster belt with a first bottom ply of endless woven high modulus monofilament yarn of 0.35 mm diameter can be produced. The high modulus monofilament yarns in the MD of this fabric could have a modulus of 100 gpd and can be made of PET. The second ply, could be made of three layers of flat woven 0.5 mm monofilament yarn with 7 dtex batt fiber layers of PET needled into each of these flat woven fabrics, can be attached to the first ply by needling. The third ply can be a 100% batt fiber layer made of 7 dtex PET by successive needling of batt layers and can be attached to the second ply by needling. This third layer could contain 750 gsm of batt fiber. A fourth ply, which can also be a endless woven fabric using monofilament yarn of 0.70 mm diameter can be needled onto the third ply by needling 300 gsm batt fiber layer of 7 dtex PET. A fabric produced in this fashion would form a structure of for example not more than 4000 gsm, which would exhibit the following properties:

1. 7-8 mm caliper static thickness, >4.8 mm thickness caliper at 2.068 Mpa compression
2. <20 cfm Frasier air permeability
3. 0.4-0.8% elongation at 8.75 KN/m
4. <0.7% creep at 8.75 KN/m for 48 hrs, saturated in 43 deg C. water The construction should be: dimensionally stable with less than 1.5% total MD creep tolerance; have a compressed thickness to allow for paste thickness adjustment within the hopper height adjustability; hydrophobicity (particularly if PET is used) to allow for water handling without absorption and subsequent contamination of lead oxide into the belt structure. It should also be durable so as to avoid wear grooves on the surface over short 1-2 day runs; and with improved surface texture to provide marking in the pasted plate over a pressure range up to 2.757 Mpa.

Note that throughout this application the sizes, dimensions, materials used etc. are used for example purposes. Modifications thereto while still within the scope of the invention will be apparent to those skilled in the art.

Thus by the present invention its objects and advantages are realized, and although preferred embodiments have been disclosed and described in detail herein, its scope and objects should not be limited thereby; rather its scope should be determined by that of the appended claims.

I claim:

1. A battery paster belt comprising of:
    a first ply of an endless fabric structure produced from high modulus monofilament yarns in both the machine direction MD and the cross machine direction CD;
    a second ply comprised of two to five layers of monofilament flat fabric, each needled with a layer of fibrous batt, and wrapped around the high modulus filament first ply;
    a third ply consisting of successive layers of batt fiber, wrapped around the second ply and attached to the second ply; and
    a fourth ply of monofilament endless fabric structure attached to the third ply through needling of a layer of batt fiber.

2. The battery paster belt according to claim 1, wherein said first ply is made of high modulus monofilament yarns approximately 0.20 mm-0.70 mm diameter, made from either polyester or polyamide.

3. The battery paster belt according to claim 1, wherein said first ply comprises high modulus monofilament yarns having a modulus of at least 70 gpd in the machine direction MD.

4. The battery paster belt according to claim 1, wherein said second ply comprises flat woven fabric made of monofilaments approximately 0.20 mm-0.70 mm diameter, made either from polyester and/or polyamide.

5. The battery paster belt according to claim 1, wherein said second ply is needled with a layer of polyester and/or polyamide batt fiber of 3-10 dtex.

6. The battery paster belt according to claim 1, wherein said third ply is made of successive layers of 100% polyester and/or polyamide batt fiber of 3-10 dtex.

7. The battery paster belt according to claim 1, wherein said third ply is wrapped around the endless structure to develop a compressed nonwoven layer approximately 400-1000 gsm.

8. The battery paster belt according to claim 1, wherein said fourth ply is an endless woven top texture fabric composed of monofilament yarns approximately 0.40-0.90 mm diameter.

9. The battery paster belt according to claim 1, wherein said fourth ply is a monofilament endless woven fabric laminated to the surface through needling of no more than 400 gsm of 3-10 dtex polyester and/or polyamide batt fiber.

10. The battery paster belt according to claim 1, wherein said fourth ply comprises a woven single or double layer plain weave in a 4-8 ends per cm square mesh.

11. The battery paster belt according to claim 1, wherein said first, second and fourth plies of fabrics are taken from the group consisting of woven, nonwoven, knitted, extruded mesh, spiral-link, MD and CD yarn arrays, and spiral wound strips of woven and nonwoven materials.

12. A method of forming a battery paster belt comprising the following steps:
    providing a first ply of an endless fabric structure produced from high modulus monofilament yarns in both the machine direction MD and the cross machine direction CD;
    providing a second ply comprised of two to five layers of monofilament flat fabric, each needled with a layer of fibrous batt, and wrapped around the high modulus filament first ply;
    providing a third ply consisting of successive layers of batt fiber, wrapped around the second ply and attached to the second ply; and
    providing a fourth ply of monofilament endless fabric structure attached to the third ply through needling of a layer of batt fiber.

13. The method of forming a battery paster belt according to claim 12, wherein said first ply is made of high modulus monofilament yarns approximately 0.20 mm-0.70 mm diameter, made from either polyester or polyamide.

14. The method of forming a battery paster belt according to claim 12, wherein said first ply comprises of high modulus monofilament yarns having a modulus of at least 70 gpd in the machine direction MD.

15. The method of forming a battery paster belt according to claim 12, wherein said second ply comprises flat woven fabric made of monofilaments approximately 0.20 mm-0.70 mm diameter, made either from polyester and/or polyamide.

16. The method of forming a battery paster belt according to claim 12, wherein said second ply is needled with a layer of polyester and/or polyamide batt fiber.

17. The method of forming a battery paster belt according to claim 12, wherein said third ply is made of successive layers of 100% polyester and/or polyamide batt fiber.

18. The method of forming a battery paster belt according to claim 12, wherein said third ply is wrapped around the endless structure to develop a compressed nonwoven layer approximately 400-1000 gsm.

19. The method of forming a battery paster belt according to claim 12, wherein said fourth ply is an endless woven top fabric composed of monofilament yarns approximately 0.40-0.90 mm diameter.

20. The method of forming a battery paster belt according to claim 12, wherein said fourth ply is a monofilament endless woven fabric laminated to the surface through needling of no more than 400 gsm of 3-10 dtex polyester and/or polyamide batt fiber.

21. The method of forming a battery paster belt according to claim 12, wherein said fourth ply comprises a woven single or double layer plain weave in a 4-8 ends per cm square mesh.

22. The method of forming a battery paster belt according to claim 12, wherein said first, second and fourth plies of fabrics are taken from the group consisting of woven, nonwoven, knitted, extruded mesh, spiral-link, MD and CD yarn arrays, and spiral wound strips of woven and nonwoven materials.

23. The method of forming a battery paster belt according to claim 16, wherein said second ply is needled with a layer of polyester and/or polyamide batt fiber at 3-10 dtex.

24. The method of forming a battery paster belt according to claim 17, wherein said third ply is made of successive layers of 100% polyester and/or polyamide batt fiber at 3-10 dtex.

* * * * *